March 24, 1931.  F. NARDONE  1,797,921
MUSICAL INSTRUMENT
Filed June 21, 1929  4 Sheets-Sheet 1
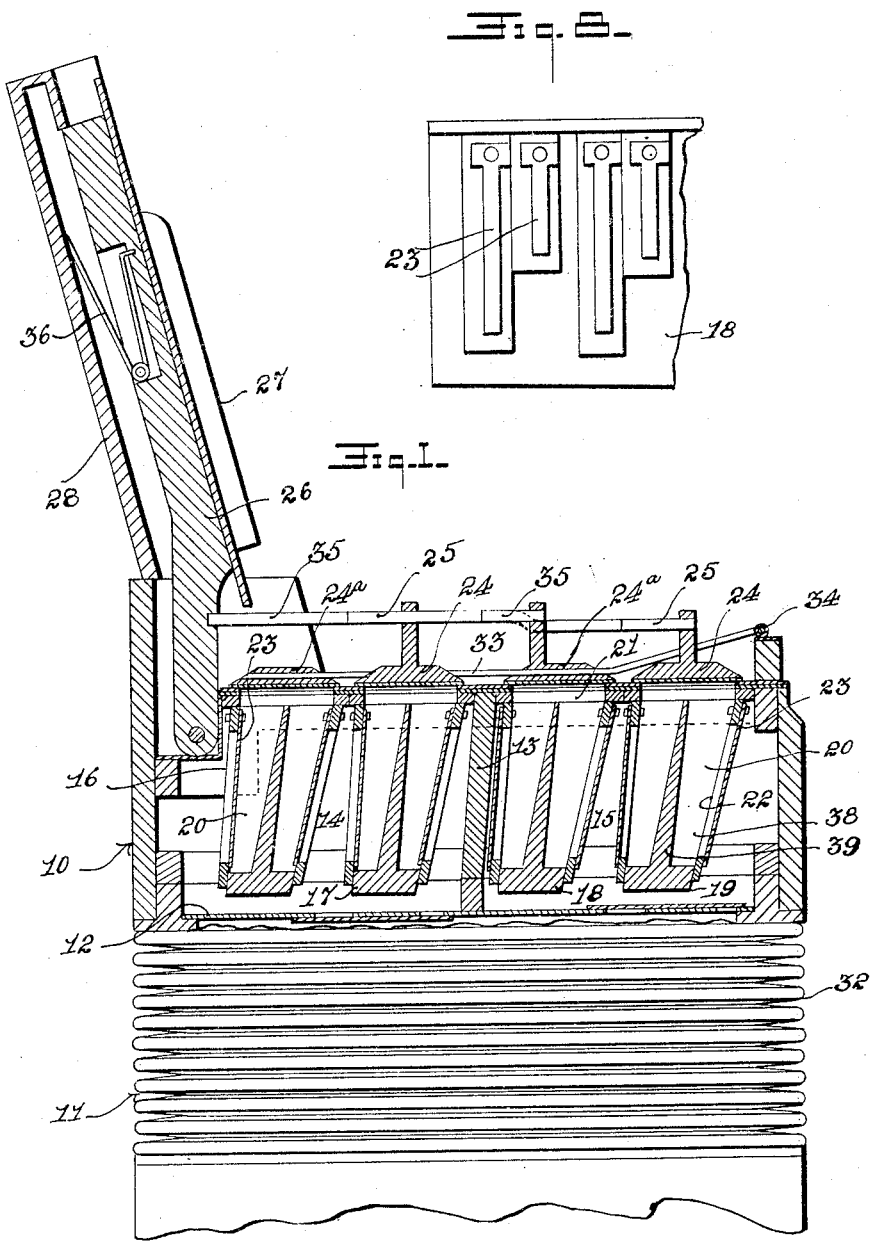

March 24, 1931.  F. NARDONE  1,797,921
MUSICAL INSTRUMENT
Filed June 21. 1929   4 Sheets-Sheet 2
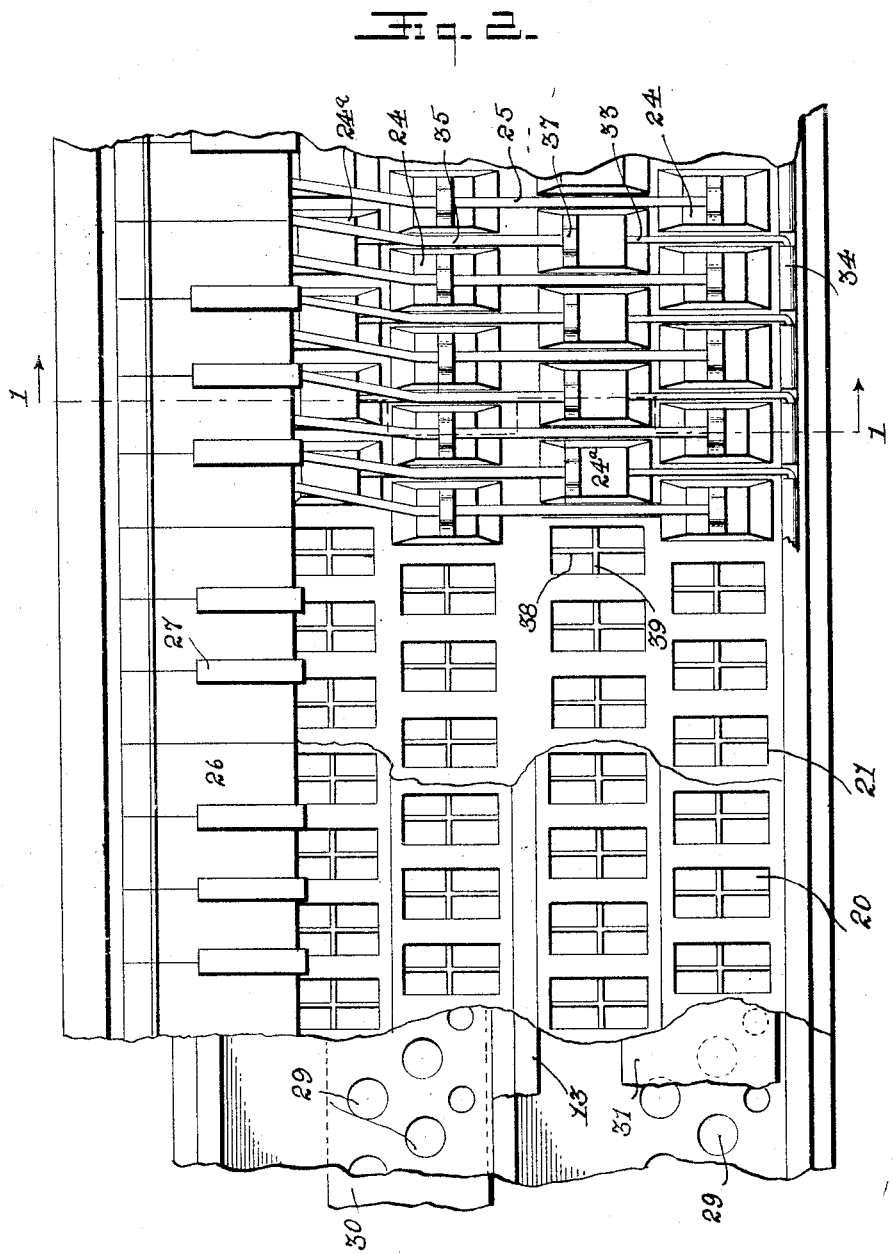

March 24, 1931. F. NARDONE 1,797,921
MUSICAL INSTRUMENT
Filed June 21, 1929  4 Sheets-Sheet 3
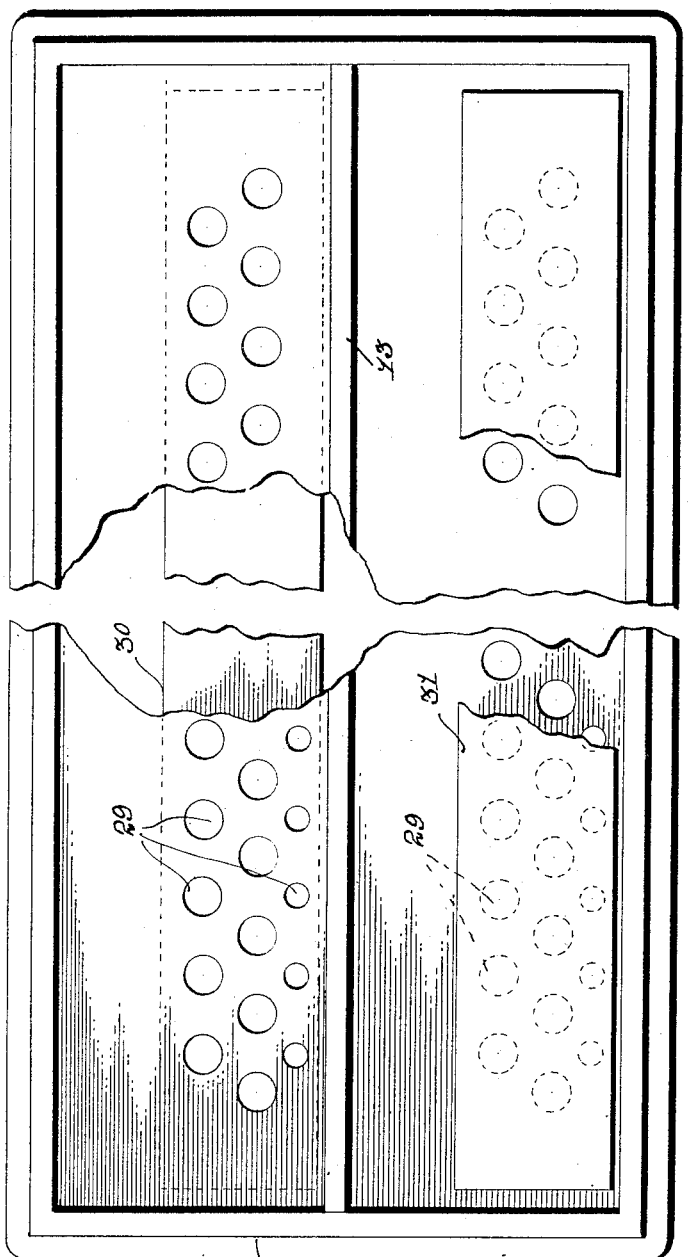

March 24, 1931.  F. NARDONE  1,797,921
MUSICAL INSTRUMENT
Filed June 21, 1929  4 Sheets-Sheet 4
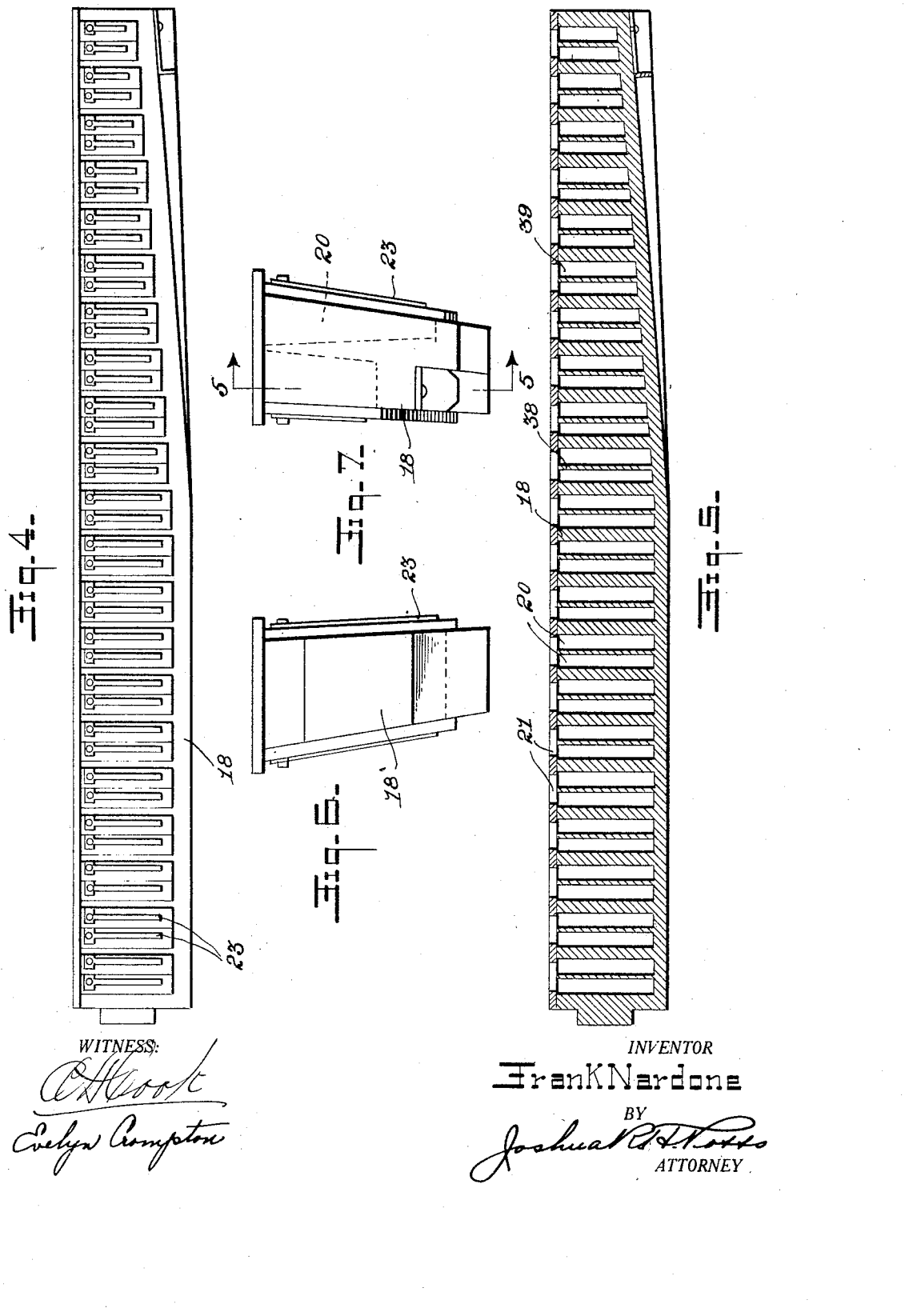

Patented Mar. 24, 1931

1,797,921

UNITED STATES PATENT OFFICE

FRANK NARDONE, OF PHILADELPHIA, PENNSYLVANIA

MUSICAL INSTRUMENT

Application filed June 21, 1929. Serial No. 372,554.

The invention relates to wind instruments and particularly to those employing reeds for production of sound. The invention is particularly applicable to accordions which are comprised of a wind box having a bellows or other means for supplying air to reeds housed in a sound box and operated by the wind so supplied under control of key operated valves and wind operated valves; the former selectively controlling the flow of air to the reeds and the latter automatically controlling the flow of air thereto.

Objects of the invention are to improve and simplify the construction of instruments of this sort, to reduce the number of parts, to facilitate the manufacture of the instrument, and to minimize the likelihood of their getting out of repair.

Further objects are to group the reeds of the same pitch sounded together in the same locality, and to provide simultaneously operated controls for groups of reeds of the same pitch.

In the present invention the reeds are arranged in compartments on opposite sides of a partition in the wind box, the reeds in the compartments formed by the said partition being oppositely arranged and operable by air flowing in opposite directions to and from the wind box and selectively past the reeds therein; the flow through the compartments being controlled by check valves oppositely arranged to the wind box and associated respectively with the respective compartments.
An embodiment of the invention illustrating the principles of the invention is shown in the accompanying drawings in which the same is shown as applied to an accordion, and in which—
Figure 1 is a fragmentary view of an accordion showing the sound box thereof, together with the keyboard in section, the bellows associated with the wind box being shown in elevation; the section of the sound box being taken on the line 1—1 of Figure 2.

Figure 2 is a fragmentary view showing the position of the keys and the associated valves for controlling passage of wind through the chambers of the reed boxes or banks and showing, over a certain portion, the said valves removed in order to illustrate the openings leading to the said chambers and still further parts being broken away to show the partition through the sound box and the arrangement of the banks of reed chambers therein and a portion to the banks of reed chambers removed showing the check valve control of the communications between the said chambers, Figure 3 is an end view of the sound box of the instrument with the sound box removed and with parts broken away illustrating the relation of the check valves to the partition between the wind box and the sound box, Figure 4 is an elevation of one of the reed boxes or banks removed from the sound box, Figure 5 is a longitudinal section through the said box, on line 5—5 of Figure 7, Figure 6 is an elevation of the reed box viewing the same from one end,

Figure 7 is a similar view showing the reed box from the opposite end, and

Figure 8 is a fragmentary view on an enlarged scale compared with Figure 4 showing the opposite side of the reed box.

Referring to the drawings in detail, 10 designates the sound box with which is associated the wind box 11, the sound box being divided from the wind box by a partition 12 and being divided into compartments by a partition 13 extending longitudinally of the sound box, said compartments being designated by the numerals 14 and 15.

Located within the compartments of the sound box are reed boxes 16, 17, 18 and 19 which are divided into banks of reed chambers 20 having end openings 21 and side openings in the nature of slots 22, the chambers being of depths corresponding to the length of the reeds associated therewith as indicated in dotted lines in Figure 7 of the drawings, the reeds which are designated by the numeral 23 being connected to the walls of the chambers and positioned to cover the said openings 22 in the reed boxes. The openings in the ends of these chambers are controlled by suitable valves 24 and 24$^a$ operable through arms 25 and 35 respectively through keys 26 and 27 arranged on a keyboard 28.

Communication between the wind box and the compartments of the sound box is effected by the provision of a plurality of apertures 29 in the partition 12 and at either side of the partition 13 and these apertures are controlled by suitable check valves which may be in the nature of strips of leather or other suitable material, as shown at 30 and 31. These strips, as clearly shown in Figure 1 of the drawings, are placed on opposite sides of the partition 12 so that the one controlling compartment 14 will operate oppositely from the one controlling the other compartment of the sound box 15.

These strips are secured to the partition 12 at their ends in any suitable manner as by glue and are of sufficient flexibility to provide for the passage of air between the same and the partition 12.

It will appear, therefore, that a movement of a current of air from the wind box will pass through the compartment 15 and a movement of a current of air toward the wind box will pass through the compartment 14 when the bellows 32 associated with the wind box is contracted or expanded as the case may be.

The reed boxes are arranged in the compartments in pairs, one reed box of each pair containing notes of the normal scale and the other containing the sharps and flats associated therewith. The reeds within the compartment 14 are arranged relatively to the openings 22 on opposite sides of the walls of the chambers 20, those in the compartment 14, as shown in Figure 1, being on the interior of the said walls and those in the compartment 15 on the exterior thereof.

It will appear, therefore, that the reeds within the compartment 14 will be sounded simultaneously with the suction stroke of the bellows and those in the compartment 15 will be sounded simultaneously with the expulsion of air from the bellows subject, of course, to certain selective control as will hereinafter be set forth.

The notes of the normal scale in each compartment are controlled through the keys 26 and the associated valves 24, the valves controlling the reed chambers 20 associated with the reeds of the normal scales being simultaneously operated through the arm 25.

It will appear from the above description that the simultaneous lifting of the valves 24 for any given note will sound that note on the reeds within one of the compartments only of the sound box according as air is being drawn in or expelled by the bellows.

The banks of reeds tuned for sharps and flats will similarly be controlled through the keys with the difference that the rods 33 by which the valves 24 and 24ª are connected together are pivotally attached to the opposite side of the sound box from that on which the keyboard is located. This attachment is designated by the numeral 34, the keys 27 each being respectively connected with one of these pairs of valves through the rods 35.

The connection 34 uniting the rod 33 with the side of the sound box is of a yielding, resilient nature and such that the valves 24ª are normally maintained closed. Similarly, the valves 24 are normally maintained closed by springs 36 placed under the keys 26, as shown in Figure 1 of the drawings.

The connection of the rods 35 is with one of the valves 24ª and is of a sliding nature between the rods 35 and lugs 37 on said valves.

In instruments of this character the volume of a given note is determined by the number of reeds sounded simultaneously and for satisfactory operation of the same arrangement must be made for the sounding of reeds giving the same note on both strokes of the bellows. To these ends, each compartment contains a duplicate of the notes in the other compartment arranged oppositely and in duplication within each compartment and with this arrangement the volume is augmented when the note is sounded and the same note will be sounded whether air is being expelled or sucked in by the bellows whenever a given key is depressed.

In the present embodiment the notes of the same pitch are arranged in groups of threes together with a fourth note differing therefrom by an octave and sounded simultaneously therewith and the notes to be simultaneously sounded are grouped together on the same reed box so that the same valve covering the apertures at the ends of the reed chambers will control all four notes. The reed chambers associated with these reeds are provided by cross partitions 38 and 39 separating the chambers 20 relating to the several reeds.

By the construction of the accordion as hereinbefore set forth, it has been possible to eliminate the check valves associated with each reed in the reed boxes which is usual in instruments heretofore manufactured together with their numerous disadvantages both in the amount of work necessary to construct an instrument along these lines and due to the fact that in the former construction the check valves became easily fouled and ceased to function as intended.

While I have specifically described an embodiment of the invention it is to be understood that the same is subject to modifications within the scope of the invention as hereinbefore set forth and hereinafter claimed.

I claim:—

1. An accordion comprising a wind box and a sound box, a partition dividing the sound box into compartments, said compartments being in communication with the wind box, reeds in both compartments of the sound boxes, those in one compartment being arranged to be sounded by air suction, those in the other by air compression between the compartments and the wind box, and means operable to control the communication between the wind box and the compartments.

2. An accordion comprising a wind box and a sound box, a partition dividing the sound box into compartments, said compartments being in communication with the wind box, reeds in both compartments of the sound boxes, those in one compartment being arranged to be sounded by air suction, those in the other by air compression between the compartments and the wind box, means operable in reverse directions and according to the arrangement of the reeds within the respective compartments for controlling the flow of air through the compartments.

3. An accordion comprising a wind box and a sound box, a partition dividing the sound box into compartments, said compartments being in communication with the wind box, reeds in both compartments of the sound boxes, those in one compartment being arranged to be sounded by air suction, those in the other by air compression between the compartments and the wind box, means operable in reverse directions and according to the arrangement of the reeds within the respective compartments for controlling the flow of air through the compartments and to and from the wind box.

4. An accordion comprising a wind box and a sound box, a partition dividing the sound box into compartments, said compartments being in communication with the wind box, reeds in both compartments of the sound boxes, those in one compartment being arranged to be sounded by air suction, those in the other by air compression between the compartments and the wind box, means operable in reverse directions and according to the arrangement of the reeds within the respective compartments for controlling the flow of air through the compartments, and means for selectively controlling the flow of air across the reeds of various pitch.

5. An accordion comprising a wind box and a sound box, a partition dividing the sound box into compartments, said compartments being in communication with the wind box, reeds in both compartments of the sound boxes, those in one compartment being arranged to be sounded by air suction, those in the other by air compression between the compartments and the wind box, and aerostatically operated check valves controlling communication between the compartments and the wind box automatically operable in opposite directions according to the alternate reverse unbalancing of air pressure.

6. An accordion comprising a compressible and expandable wind box, a sound box provided with compartments having communication with the wind box, check valves controlling the passage of air between the wind box and said compartments, each aerostatically operated respectively upon the compression and expansion of the sound box, and sound producing means in said compartments, those in one compartment being operated reversely from those in the other.

7. An accordion comprising a wind box, means for producing a compression and a suction of air therein, a sound box having compartments, means aerostatically operated for placing the compartments in communication with the sound box automatically and alternately upon the compression and the attenuation of air respectively in the wind box, and means in the said compartments adapted to be sounded when said communication is effected.

8. An accordion comprising a collapsible wind box, a sound box divided into compartments, reed banks each having a plurality of chambers provided with apertures in the sides thereof for accommodating reeds, said chambers having openings at one end, valves controlling said openings, the reeds on the boxes in one compartment operating oppositely from those in the other compartment, the accordion having openings between the compartments and the wind box and a check valve between each compartment and the wind box operating oppositely to each other and according to the direction of operation of the reeds within the compartments.

9. An accordion comprising a wind box, a sound box divided into compartments, a pair of reed banks in each compartment, valves controlling the supply of air to the reeds, keys each controlling a pair of said valves, one of which valves is associated with each compartment and a valve associated with each compartment controlling the passage of air between said compartments and the wind box, said last named valves operating oppositely under influence of air movement, and means for changing the direction of air movement between the sound box and the wind box, the reeds in one compartment being reversed relative to those in the other compartment.

10. An accordion having a wind box, a sound box, a partition dividing the sound box into compartments, reed banks in the sound boxes having reed chambers provided with apertures in their walls, and reeds covering said apertures, the reeds in one compartment being on the inside and those in the other compartment being on the outside of said reed boxes, and valves arranged in pairs and connected to operate together controlling reed chambers in the respective compartments, passages between the wind box and compartments, oppositely arranged aerostatically operated check valves controlling said passageways and means for causing wind movement to and from the wind box and through said compartments.

11. An accordion having a wind box, a sound box partitioned to provide compartments, a reed box in each compartment having notes of corresponding pitch, keys having pairs of valves associated therewith and operable simultaneously therewith to permit passage of air through the reed boxes, aerostatically operated valves controlling passage of air to and from the wind box in one direction through one compartment and in the opposite direction through the other compartment.

12. An accordion having a wind box, a sound box partitioned to provide compartments, a reed box in each compartment having notes of corresponding pitch, keys having pairs of valves associated therewith and operable simultaneously therewith to permit passage of air through the reed boxes, automatically operable valves controlling passage of air to and from the wind box in one of said directions through one compartment and in the other through the other compartment.

13. An accordion having a wind box, a sound box having compartments communicating with the wind box by passages, banks of reed chambers in each compartment having reeds in one chamber corresponding in pitch to reeds in the other, valves controlling each group, the valves controlling corresponding groups being operable simultaneously, the reeds of the bank in one compartment operating oppositely from those in the other compartment and oppositely operating valves controlling the passage of air between the wind box and said compartments.

14. An accordion having a wind box, a sound box divided into compartments communicating with the wind box, a bank of reeds in each compartment having groups of reeds corresponding in pitch to each other and to groups in the other compartment, valves operable simultaneously for controlling the sounding of the reeds of said corresponding groups, the reeds in one compartment being oppositely arranged to those in the other and valves oppositely operable under air pressure to and from the wind box for controlling the passage of air through said compartments.

In testimony whereof I have signed my name to this specification.

FRANK NARDONE.